Sept. 3, 1968 N. C. JACKSON 3,399,448
METHOD OF MANUFACTURING STRIP STRUCTURES
Filed Nov. 2, 1964 2 Sheets-Sheet 1
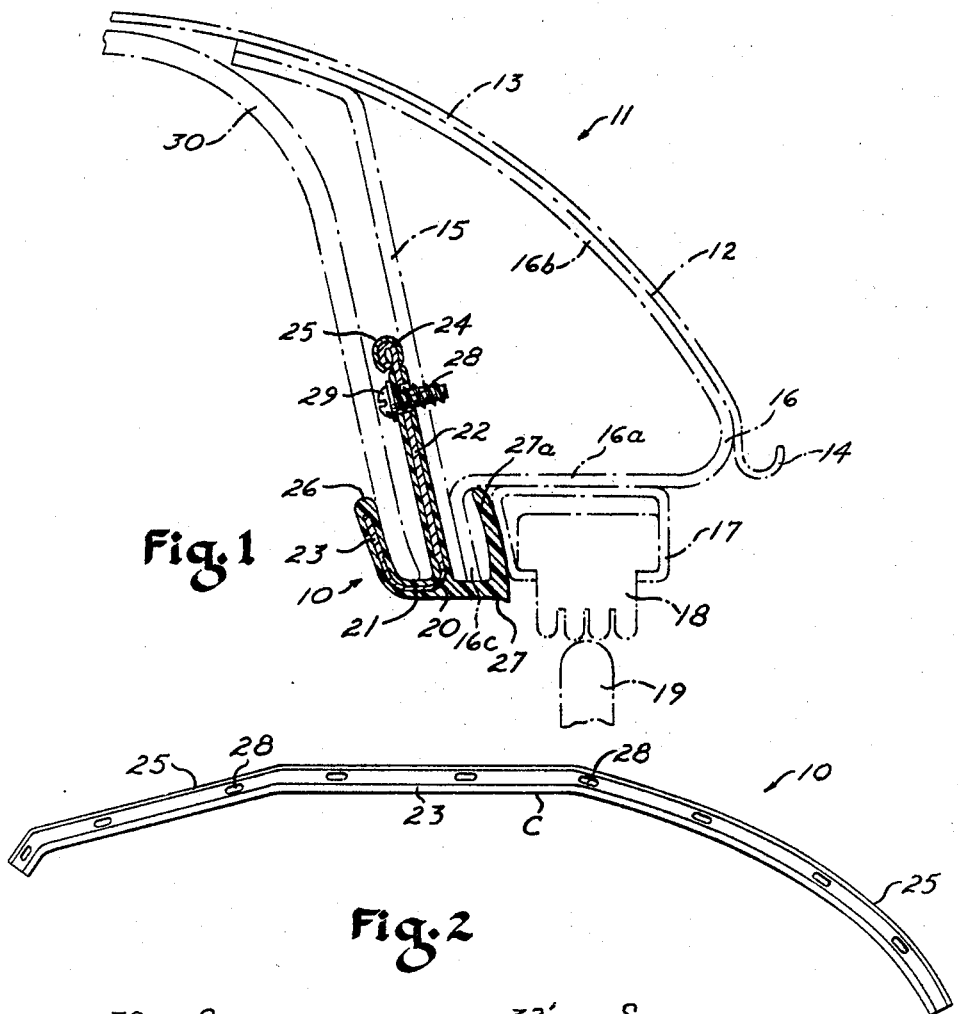
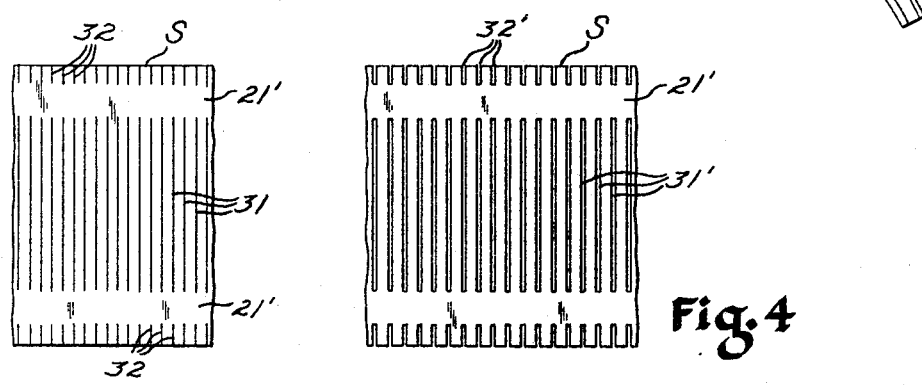
INVENTOR.
Norman C. Jackson
BY
Meyer, Baldwin, Doran & Egan Sept. 3, 1968  N. C. JACKSON  3,399,448
METHOD OF MANUFACTURING STRIP STRUCTURES
Filed Nov. 2, 1964  2 Sheets-Sheet 2

INVENTOR.
Norman C. Jackson
BY
Meyer, Baldwin, Doran & Egan

United States Patent Office 3,399,448
Patented Sept. 3, 1968

3,399,448
METHOD OF MANUFACTURING
STRIP STRUCTURES
Norman C. Jackson, Sheffield Lake, Ohio, assignor to The Standard Products Company, Cleveland, Ohio, a corporation of Ohio
Filed Nov. 2, 1964, Ser. No. 408,097
6 Claims. (Cl. 29—415)

ABSTRACT OF THE DISCLOSURE

The method of making a core for a strip structure comprising the step of providing a flat sheet metal strip with a series of transverse, closely spaced slits extending inwardly from the side edges of the strip and terminating at their inner ends adjacent to a continuous, unslitted portion extending lengthwise of the strip, the step of elongating the strip by reducing the thickness of the continuous portion with the result that the slits are changed into slots defining a plurality of narrow elements extending laterally from the continuous portion, the step of forming said strip into a generally channel shape with said continuous portion comprising the web of the channel and said elements projecting away from the web, the step of applying a common connecting means to the distal ends of the elements on one side of the web, the step of providing the strip with a flexible covering material, and the step of securing the common connecting means to said distal ends to maintain said distal ends in a fixed, spaced relationship.

---

This invention relates to strip structures of the type having a resilient or malleable sheet metal core so designed as to be bendable and being provided with a flexible outer covering extruded or otherwise suitably applied to the core. The strip structure as herein disclosed is illustrated in its use as a headliner retainer for interior trim piece for an automobile, and the invention relates to methods for manufacture thereof.

The invention has for its primary object the provision of a method of making an article of the aforesaid nature which is characterized by its structural simplicity, its inexpensive manufacturing costs, the attractive forms in which it may be made, and the particularly effective manner in which its performs its function.

A more specific object of the invention is to provide a strip structure of the aforesaid character having a channel shape core made of sheet material wherein at least one of the flanges of the channel is slotted to provide elongated elements, a covering being provided for the core and means being provided for fixing the distal ends of the elements in a particular spaced relationship.

A further object is to provide a method for making the core comprising transversely slitting a metal strip at its edges partially across the width of the strip and stretching the strip to cause the slits to separate and become slots.

Another object is to provide the method referred to wherein the stretching of the strip is effected by reducing the thickness of the sheet metal along its unslitted portion.

A further object is to provide a method as set forth above wherein two core structures are manufactured from a single strip of sheet metal.

Still another object is to provide a method for manufacturing a strip structure wherein a core made according to the above method is provided with a flexible covering and means are provided for maintaining the structure in a nonlinear shape.

Further objects of the present invention, and a number of its advantages, will be referred to in or will be evident from the following description of one embodiment of the invention as illustrated in the accompanying drawings.

FIG. 1 is a transverse section of the strip structure of this invention applied as a trim piece or headliner retainer for an automobile, portions of the automobile being shown in broken line.

FIG. 2 is a side elevation of the headliner retainer.

FIG. 3 is a plan view of a short length of flat sheet metal strip which has been slitted in an initial step in the manufacture of the strip structure.

FIG. 4 shows the next step in the manufacture of the strip structure wherein the length of strip has been stretched longitudinally of the strip.

Figure 5:
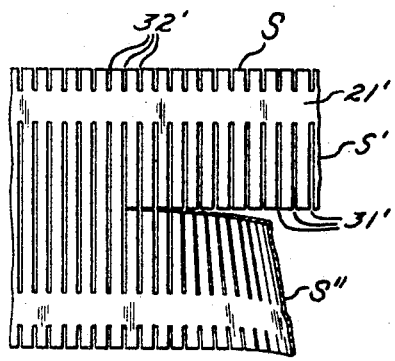
FIG. 5 shows the next step in the manufacture of the strip structure wherein the length of strip is cut longitudinally along its center line into two strip portions.

Before the article illustrated is specifically described, it is to be understood that the invention here involved is not limited to the structural details or arrangement of parts shown since strip structures embodying the present invention may take various forms. It is also to be understood that the phraseology or terminology herein employed is for the purpose of description and not of limitation since the scope of the present invention is denoted by the appended claims.

Referring now to the drawings, FIG. 1 shows a headliner retainer 10 mounted adjacent to the roof edge of an automobile, a portion of the automobile being shown in broken line at 11. The automobile 11 is of a standard modern construction having a box frame 12 disposed longitudinally of the vehicle along the side of the car adjacent to the side edge of the car roof. The box frame 12 supports a sheet metal roof 13 which curves downwardly in a lateral direction and carries an upwardly curved gutter 14 along its lateral edge. The box frame 12 has an inner, slanted frame member 15 welded or otherwise suitably secured to a contoured frame member 16 having a laterally projecting horizontal portion 16a and an upwardly and inwardly curved portion 16b, the portion 16b being shaped to conform to the curve of the roof 13 which it supports. The horizontal portion 16a has a generally downwardly turned flange 16c which is disposed flatwise against a lower edge portion of the slanted frame member 15 and is welded or otherwise suitably secured thereto. A window seal retainer 17 carrying a resilient seal 18 is secured to the bottom surface of the horizontal portion 16a of the box frame 12, said seal retainer being spaced laterally outwardly a short distance from the flange 16c of the contoured frame member 16. The seal 18 is adapted to receive the upper edge of a window glass 19 which in its fully raised position compressively abuts said seal at its upper edge.

The headliner retainer 10 comprises a sheet metal core 20 bent to a generally channel shape whereby it includes a web 21, a generally upturned, longer flange 22, and a generally upturned, shorter flange 23. As will hereinlater become apparent, the flanges 22 and 23 are slotted whereby they comprise pluralities of narrow elements or legs, and the use of the term "flange" is intended to include generally all of said legs or elements disposed along either side of the web 21.

The upper free edge of the longer flange 22 is provided with a roll 24 which is embraced by a bead 25. A cover 26 made of plastic or other suitable material is extruded or otherwise suitably applied to the core 20 whereby the entire core below the level of the roll 24 and the bead 25 is encased within said cover. The cover 26 includes a laterally outwardly projecting channel portion 27 having an upturned flange 27a, said channel portion 27 not being reinforced by an inner core.

The upper portion of the longer flange 22 is apertured at 28 whereby said longer flange is secured flatwise against the slanted frame member 15 by suitable screw means 29. The headliner retainer 10 is so positioned that the lower edge of the slanted frame member 15 and the lower edge of the flange 16c of the contoured frame member 16 are seated in the bottom of the channel portion 27 with the flange 27a projecting upwardly between the window seal retainer 17 and said flange 16c. The flange 27a is compressively disposed against the seal retainer 17 to provide a snug fit therebetween and to afford a finished, neat appearance at the interior of the automobile.

The web 21 of the core 20 projects laterally inwardly of the automobile, and a headliner 30 of the vehicle is seated along its lateral edge in the bottom of the inner channel formed by the flanges and web of the core 20. The outer surface of the cover 26 which is exposed within the automobile is preferably provided with a decorative pattern to enhance the appearance of the interior of the automobile.

FIG. 2 shows a typical headliner retainer 10 for a modern automobile which has been shaped to the contour of the side of an automobile roof, the left-hand end of said headliner retainer representing that portion which would be adjacent to the front of the automobile cab and the right-hand portion being curved gracefully downwardly to conform with the shape of the rear of the automobile. It will be understood that this illustration of a headliner retainer is given by way of example of a practical application of the strip structure of this invention and that the shape thereof may vary depending upon the current styling of automobiles. One feature of the present invention is the inclusion of means for retaining the headliner retainer in a nonlinear shape such as illustrated in FIG. 2, the details of this feature being set forth below in a discussion of the method of manufacturing the strip structure and headliner retainer.

FIGS. 3–8 show successive steps in the manufacture of the strip structure of the present invention from which the headliner retainer of FIGS. 1 and 2 can be made. It will be readily appreciated that the exact sequence of steps as herein illustrated and described is not critical to the invention, the following constituting one highly acceptable sequence.

FIG. 3 shows a short length of flat, sheet metal strip S, the longitudinal dimension of the strip being disposed horizontally as illustrated. The strip S is preferably made of resilient or malleable metal whereby it can be readily shaped into the form of the core and whereby it affords shaping of the core itself once formed.

The strip S is initially provided with a multiplicity of transversely directed slits 31 which terminate in either lateral direction at a continuous, nonslitted portion 21' disposed adjacent to either edge of the strip. Additional slits 32 extend laterally inwardly from the side edges of the strip S, terminating at their inner ends at the continuous portion 21'. It will be understood that a strip S of undetermined length may be provided with the slits 31 and 32 in a continuous process of manufacture of the strip structure.

FIG. 4 shows the same length of strip S after it has been stretched longitudinally to cause the slits 31 and 32 to widen and become slots as indicated at 31' and 32'. The stretching process comprises reducing the thickness of the continuous portions 21' thereby causing only them to increase in dimension lengthwise of the strip.

FIG. 5 illustrates the manner in which the strip S is cut longitudinally along its center line to provide two strip portions S' and S". The strip portions S' and S" are identical in form, and each is adapted for further forming into a core for use in the strip structure of this invention.

Figure 6:
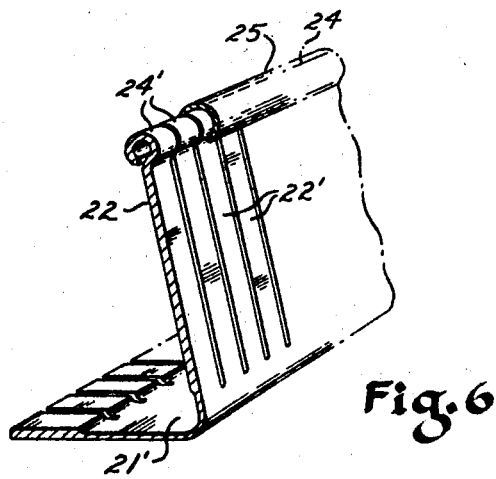
FIG. 6 is a perspective view of one strip portion showing the next step in which the strip portion is bent to L-shape and a bead is applied to one edge.

A further step in the manufacture of the strip structure is illustrated in FIG. 6 wherein a strip portion S' or S" is bent to a generally L-shape thereby forming the longer flange 22 which comprises a multiplicity of relatively narrow, elongated elements or legs 22'. The upper edge of the flange 22 is provided with the aforementioned roll 24 which comprises a multiplicity of roll segments 24' formed at the distal ends of the legs 22'. The bead 25 is applied to the roll 24 or the roll segments 24', and it will be noted that at this point in the manufacture of the strip structure, both the roll 24 and the bead 25 are circular in cross-section. The bead 25 is preferably a snug although slidable fit upon the roll 24 or roll segments 24'.

Figure 7:
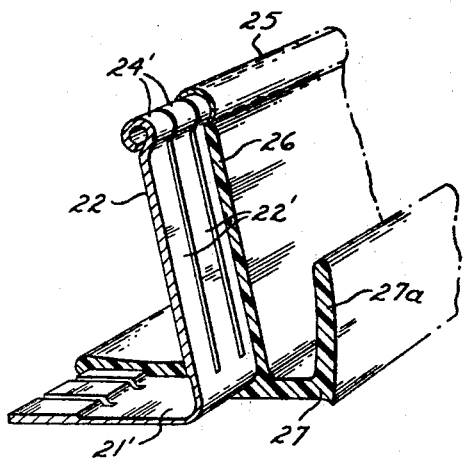
FIG. 7 shows the strip portion of FIG. 6 with the covering applied thereto.

FIG. 7 shows the cover 26 extruded upon or otherwise suitably applied to the partially formed core or strip portion S' or S". It will be noted that the cover 26 terminates closely adjacent to or slightly overlapping the bead 25 but leaves said bead substantially exposed.

Figure 8:
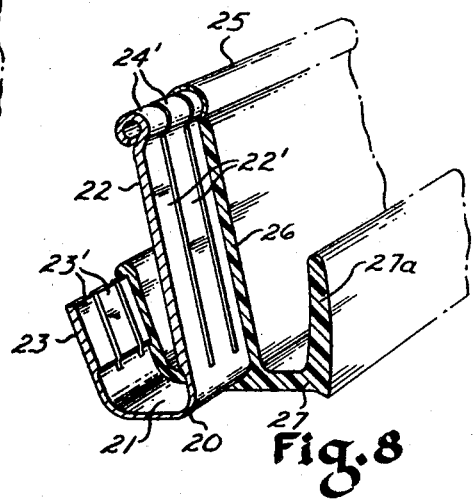
FIG. 8 shows the final form of the strip structure wherein the strip portion, constituting the core, is bent into a channel shape.

Another step in the forming of the strip structure of this invention is illustrated in FIG. 8 wherein the strip portion is formed into a channel shape thereby providing the core 20 illustrated in FIG. 1. The continuous portion 21' then becomes the aforementioned web 21, and the shorter flange 23 comprising a multiplicity of relatively narrow legs or elements 23' is provided. It will be noted that the resulting form of the strip structure makes it particularly readily bendable about transverse axes disposed parallel with the web 21 because the distal ends of the elements 22' and 23' can move relative to each other. Because the bead 25 is slidable over the roll segments 24', an outward curve can be provided at the upper edge of the longer flange 22 even though the bead 25 is not itself capable of being elongated.

In the manufacture of a headliner retainer such as that shown in 10 at FIG. 2, strip structure as shown in FIG. 8 is cut to a suitable length and then pressed against a form corresponding to the desired inner contour of the headliner retainer as indicated at C of said FIG. 2. The strip structure is pressed against a mold form (not shown) with the web 21 of the core 20 disposed generally flatwise against a surface whose contour corresponds to the contour desired at C, the inner surface of the headliner retainer. The strip structure is thus formed around axes which are disposed transversely of the strip structure and generally parallel with and below the web 21. This causes the legs or elements 22' and 23' to separate and diverge outwardly or upwardly, the roll segments 24' sliding away from each other within the bead 25. With the strip structure held to the desired nonlinear shape, the bead 25 is then compressed tightly upon the roll segments 24' thus somewhat flattening said bead and said segments, as illustrated in FIG. 1, and firmly fixing the distal ends of the legs 22' whereby the strip structure will maintain the shape given to it by the form. The apertures 28 are then provided for receiving the screw means 29, said apertures as herein illustrated being elongated in the direction of the strip structure whereby the exact placing of the screw means is not critical. The headliner retainer 10 is then ready to be mounted to the automobile in the manner illustrated in FIG. 1 in the particular adaptation of the invention as herein illustrated.

It will be understood that many changes in the details of the invention as herein described and illustrated may be made without, however, departing from the spirit thereof or the scope of the appended claims.

What is claimed is:

1. The method of making a core for a strip structure comprising the step of providing a flat sheet metal strip, forming a longitudinally spaced series of transverse discontinuous slits extending laterally inwardly from at least one edge thereby leaving at least one unslitted portion intermediate the longitudinal edges of the strip, the step of reducing the thickness of the unslitted portion of the strip thereby elongating the strip and changing the slits into slots defining a plurality of narrow elements, and the step of forming said strip into a generally channel shape with the unslitted portion forming at least a portion of the web of the channel and said elements projecting in both directions from said unslitted portion.

2. The method of making a core for a strip structure comprising the step of providing a flat sheet metal strip with a series of transverse, closely spaced slits extending inwardly from the side edges of the strip and terminating at their inner ends adjacent to a continuous, unslitted portion extending lengthwise of the strip, the step of elongating the strip by reducing the thickness of the continuous portion with the result that the slits are changed into slots defining a plurality of narrow elements extending laterally from the continuous portion, the step of forming said strip into a generally channel shape with said continuous portion comprising the web of the channel and said elements projecting away from the web, the step of applying a common connecting means to the distal ends of the elements on one side of the web, the step of providing the strip with a flexible covering material, and the step of securing the common connecting means to said distal ends to maintain said distal ends in a fixed, spaced relationship.

3. The method of making strip structures comprising the step of providing a flat sheet metal strip with a series of transverse slots extending inwardly from the lateral edges of the strip and terminating at their inner ends adjacent to a continuous, unslotted portion extending lengthwise of the strip, the slots defining a plurality of narrow elements extending laterally from said continuous portion, the step of forming said strip into a generally channel shape with said continuous portion comprising the web of the channel and said elements projecting away from the web, the step of applying a common connecting means to the distal ends of the elements on one side of the web, the step of providing the strip with a flexible covering material, and the step of securing the common connecting means to said distal ends to maintain said distal ends in a fixed, spaced relationship.

4. The method of making strip structures comprising the step of providing a flat sheet metal strip with a series of transverse slots extending inwardly from the lateral edges of the strip and terminating at their inner ends adjacent to a continuous, unslotted portion extending lengthwise of the strip, the slots defining a plurality of narrow elements extending laterally from the continuous portion, the step of forming the strip into a generally L-shape whereby the elements along one side of the web are angled relative to the original plane of the strip, the step of applying a common connecting means to the distal ends of the elements along said one side of the web, the step of providing the strip with a flexible covering material, the step of bending the strip into a channel shape, and the step of securing the common connecting means to said distal ends to maintain said distal ends in a fixed spaced relationship.

5. The method of making strip structures comprising the step of providing a flat sheet metal strip with a series of transversely projecting, integral legs extending laterally from a continuous, uninterrupted portion disposed inwardly from the side edges of the strip, the legs along one side being longer than those along the other side, the step of forming the strip into a generally L-shape, the step of rolling the distal end portions of the longer legs, the step of applying a continuous metal bead to all of the rolled portions, the step of providing the strip with a flexible cover, the step of bending the strip into a channel shape with the continuous portion comprising the web of the channel, and the step of compressing the bead tightly upon all of the rolled portions to maintain the distal ends of the longer legs in a fixed spaced relationship.

6. The method of making a core for a strip structure comprising the step of providing a flat sheet metal strip with a series of transverse, closely spaced slits, which terminate inwardly of the side edges of the strip, and additional slits aligned with said first mentioned slits extending inwardly from the edges of the strip and terminating at their inner ends adjacent to continuous, unslitted portions extending lengthwise of the strip, the step of elongating the strip by reducing the thickness of the continuous portions with the result that the slits are changed into slots defining a plurality of narrow elements extending laterally from the continuous portions and a plurality of narrow elements connecting said continuous portions, the step of cutting said strip longitudinally along its center line to provide two symmetrical strip portions, the step of forming a strip portion into a generally channel shape with its continuous portion comprising the web of the channel and its elements projecting away from the web, the step of applying a common connecting means to the distal ends of the elements on one side of the web, the step of providing the strip portion with a flexible covering material, and the step of securing the common connecting means to said distal ends to maintain them in a fixed, spaced relationship.

References Cited
UNITED STATES PATENTS

| | | | |
|---|---|---|---|
| 1,727,184 | 9/1929 | Thompson | 29—505 X |
| 2,346,347 | 4/1944 | Balfe | 29—505 |
| 3,167,856 | 2/1965 | Zoller | 29—413 |
| 2,754,575 | 7/1956 | Bruce | 29—460 |
| 3,195,948 | 7/1965 | Sturtevant et al. | 296—137 |
| 3,222,769 | 12/1965 | Le Plae | 29—527 X |
| 1,143,211 | 6/1915 | Lobley. | |

CHARLIE T. MOON, *Primary Examiner.*